(12) United States Patent      (10) Patent No.:   US 12,606,165 B2

Araki et al.      (45) Date of Patent:    Apr. 21, 2026

---

(54) VEHICLE CONTROL APPARATUS AND VEHICLE CONTROL PROGRAM PRODUCT

(71) Applicants: DENSO CORPORATION, Kariya-city (JP); TOYOTA JIDOSHA KABUSHIKI KAISHA, Toyota (JP)

(72) Inventors: Ryotaro Araki, Tokyo (JP); Yohei Masui, Tokyo (JP); Yuji Kosaka, Tokyo (JP); Naoki Kusumoto, Okazaki (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 18/620,710

(22) Filed: Mar. 28, 2024

(65) Prior Publication Data

US 2024/0239343 A1     Jul. 18, 2024

Related U.S. Application Data

(63) Continuation of application No. PCT/JP2022/035500, filed on Sep. 22, 2022.

(30) Foreign Application Priority Data

Sep. 30, 2021    (JP) ................................. 2021-162055

(51) Int. Cl.
   *B60W 30/16*      (2020.01)
   *B60W 30/14*      (2006.01)
   *B60W 30/18*      (2012.01)

(52) U.S. Cl.
   CPC ........ *B60W 30/162* (2013.01); *B60W 30/146* (2013.01); *B60W 30/18163* (2013.01);
            (Continued)

(58) Field of Classification Search
   CPC ............. B60W 30/162; B60W 30/146; B60W 30/18163; B60W 2554/4041;
            (Continued)

(56) References Cited

U.S. PATENT DOCUMENTS

| | | | | |
|---|---|---|---|---|
| 8,781,707 B2 * | 7/2014 | Kagawa | ................ | B60W 30/16 |
| | | | | 340/936 |
| 9,779,628 B2 * | 10/2017 | Yamashiro | ............... | G08G 1/22 |

(Continued)

FOREIGN PATENT DOCUMENTS

| | | |
|---|---|---|
| JP | 2005-324727 A | 11/2005 |
| JP | 2016-149122 A | 8/2016 |

(Continued)

OTHER PUBLICATIONS

WO-2022224587-A1 machine translation (Year: 2022).*

*Primary Examiner* — Angelina M Shudy
(74) *Attorney, Agent, or Firm* — Precision Patents, P.C.

(57)          ABSTRACT

In a vehicle control apparatus, an acquiring unit acquires factor information that causes acceleration or deceleration of the own vehicle while the own vehicle is subjected to the acceleration/deceleration control. A setting unit sets, based on the factor information, a maximum level of deceleration and/or a maximum level of acceleration. The maximum level of deceleration represents a maximum rate of reduction in a speed of the own vehicle during deceleration of the own vehicle. The maximum level of acceleration represents a maximum rate of increase in the speed of the own vehicle during acceleration of the own vehicle. A control unit is operative to perform (i) deceleration control of the own vehicle using the maximum level of deceleration as an upper limit for the deceleration control, and/or (ii) acceleration control of the own vehicle using the maximum level of acceleration as an upper limit for the acceleration control.

11 Claims, 4 Drawing Sheets

(52) U.S. Cl.
CPC ..... *B60W 2520/10* (2013.01); *B60W 2552/10* (2020.02); *B60W 2554/4041* (2020.02); *B60W 2555/60* (2020.02); *B60W 2720/106* (2013.01)

(58) Field of Classification Search
CPC ......... B60W 2555/60; B60W 2552/10; B60W 2520/10; B60W 2720/106; B60W 30/16; B60W 40/04; B60W 60/00; B60W 30/165; G05D 1/00; G01C 21/00; G08G 1/00; G06V 20/58
See application file for complete search history.

(56) References Cited

U.S. PATENT DOCUMENTS

| | | | | |
|---|---|---|---|---|
| 10,336,336 | B2 * | 7/2019 | Matsumoto | B60W 30/16 |
| 10,486,712 | B2 * | 11/2019 | Niino | G08G 1/167 |
| 10,766,488 | B2 * | 9/2020 | Tokimasa | G01S 13/723 |
| 10,831,210 | B1 * | 11/2020 | Kobilarov | B60W 60/0013 |
| 10,953,883 | B2 * | 3/2021 | Sakaguchi | B60W 30/18163 |
| 11,941,986 | B2 * | 3/2024 | Ellis | G06F 18/2431 |
| 12,037,013 | B1 * | 7/2024 | Linscott | G06N 20/00 |
| 12,275,403 | B2 * | 4/2025 | Goto | B60W 30/16 |
| 12,472,979 | B2 * | 11/2025 | You | B60W 60/0015 |
| 2003/0163239 | A1 * | 8/2003 | Winner | B60K 31/0008 |
| | | | | 701/93 |
| 2005/0171676 | A1 * | 8/2005 | Seki | B60T 7/22 |
| | | | | 180/170 |
| 2005/0256630 | A1 | 11/2005 | Nishira et al. | |
| 2008/0243351 | A1 * | 10/2008 | Isogai | B60W 30/16 |
| | | | | 701/96 |
| 2014/0309837 | A1 * | 10/2014 | Ham | B60W 30/18145 |
| | | | | 701/25 |
| 2015/0360688 | A1 * | 12/2015 | Tanaka | B60W 30/143 |
| | | | | 701/93 |

| | | | | |
|---|---|---|---|---|
| 2016/0139598 | A1 * | 5/2016 | Ichikawa | B60W 30/09 |
| | | | | 701/25 |
| 2016/0281620 | A1 * | 9/2016 | Nakade | F02D 41/10 |
| 2016/0297447 | A1 * | 10/2016 | Suzuki | B60W 30/16 |
| 2016/0332622 | A1 * | 11/2016 | Shiraishi | B60T 7/22 |
| 2017/0072926 | A1 * | 3/2017 | Fukuda | B60W 10/06 |
| 2017/0158199 | A1 * | 6/2017 | Pallett | B60W 30/18145 |
| 2017/0183013 | A1 * | 6/2017 | Matsumoto | B60W 30/16 |
| 2017/0355368 | A1 | 12/2017 | O'Dea et al. | |
| 2018/0017971 | A1 * | 1/2018 | Di Cairano | B62D 15/02 |
| 2018/0029604 | A1 * | 2/2018 | Niino | B60W 30/181 |
| 2018/0105186 | A1 * | 4/2018 | Motomura | G06V 10/82 |
| 2018/0118146 | A1 * | 5/2018 | Ito | G01S 13/58 |
| 2019/0126928 | A1 * | 5/2019 | Sakaguchi | B60W 10/06 |
| 2019/0308617 | A1 * | 10/2019 | Groult | B60Q 1/543 |
| 2020/0148204 | A1 * | 5/2020 | Kunz | B60W 60/0013 |
| 2020/0398822 | A1 * | 12/2020 | Hara | B60W 30/0956 |
| 2021/0009115 | A1 * | 1/2021 | Ohmura | B60T 8/92 |
| 2022/0032888 | A1 * | 2/2022 | Baba | B60W 30/09 |
| 2022/0048513 | A1 * | 2/2022 | Xu | B60W 30/18163 |
| 2022/0063622 | A1 * | 3/2022 | Jumpertz | G08G 1/22 |
| 2022/0242404 | A1 * | 8/2022 | Maurer | B60W 30/095 |
| 2022/0250621 | A1 * | 8/2022 | Iba | B60W 10/18 |
| 2023/0399013 | A1 * | 12/2023 | Kume | B60W 30/162 |
| 2024/0174230 | A1 * | 5/2024 | Saito | B60W 30/143 |
| 2024/0383471 | A1 * | 11/2024 | Yata | B60W 30/09 |
| 2025/0018926 | A1 * | 1/2025 | Goodarzi | B60W 30/02 |
| 2025/0026347 | A1 * | 1/2025 | Ishikawa | G06V 20/56 |
| 2025/0224253 | A1 * | 7/2025 | Wimpfheimer | G01C 21/3807 |
| 2025/0296561 | A1 * | 9/2025 | Honda | B60W 30/143 |

FOREIGN PATENT DOCUMENTS

| | | | | |
|---|---|---|---|---|
| JP | | 2016-210380 A | 12/2016 | |
| JP | | 6327244 B2 | 5/2018 | |
| WO | WO-2022224587 A1 * | 10/2022 | | G08G 1/167 |

* cited by examiner

VEHICLE CONTROL APPARATUS AND VEHICLE CONTROL PROGRAM PRODUCT

CROSS REFERENCE TO RELATED APPLICATION

This application is a bypass continuation application of currently pending international application No. PCT/JP2022/035500 filed on Sep. 22, 2022 designating the United States of America, the entire disclosure of which is incorporated herein by reference, the international application being based on and claiming the benefit of priority from Japanese Patent Application No. 2021-162055 filed on Sep. 30, 2021, the disclosure of which is incorporated in its entirety herein by reference.

TECHNICAL FIELD

The present disclosure relates to vehicle control apparatuses and vehicle control program products.

BACKGROUND

A typical one of available vehicle control apparatuses performs acceleration/deceleration control of a traveling own vehicle. Specifically, such a vehicle control apparatus performs tracking control of a traveling own vehicle to a target preceding vehicle as the acceleration/deceleration control of the traveling own vehicle. The tracking control of a traveling own vehicle is configured to control acceleration and/or deceleration of the own vehicle to accordingly maintain a safe distance from a target preceding vehicle ahead of the own vehicle. Japanese Patent Publication No. 6327244 discloses an example of such tracking control.

SUMMARY

Acceleration/deceleration control of an own vehicle traveling in a lane, i.e., an own lane, can select a vehicle traveling in a lane adjacent to the own lane as a target preceding vehicle; the vehicle traveling in the lane adjacent to the own lane is indicated by the direction of a predetermined turn signal of the own vehicle. Then, the acceleration/deceleration control of the own vehicle can control the speed of the own vehicle to cause the speed of the own vehicle to track the speed of the target preceding vehicle.

Deceleration of the own vehicle during lane changes may result in an unexpected situation, such as a situation that may force a rear vehicle traveling to the rear of the own vehicle to perform sudden deceleration if the rear vehicle did not expect the deceleration of the own vehicle. Deceleration of the own vehicle due to various factors in addition to lane changes may also result in an unexpected situation, such as a situation that may force the rear vehicle to perform sudden deceleration.

Additionally, unexpected acceleration of the own vehicle that is controlled to track a target preceding vehicle due to, for example, unexpected acceleration of the target preceding vehicle may result in unexpected situation, such as a situation that causes a driver of the own vehicle to feel a sense of danger.

The present disclosure seeks to provide vehicle control apparatuses and vehicle control program products, each of which is capable of performing suitably controlled acceleration/deceleration of an own vehicle.

The present disclosure provides, as a first aspect, a vehicle control apparatus for executing acceleration/deceleration control of an own vehicle traveling in a lane as an own lane. The vehicle control apparatus includes an acquiring unit configured to acquire factor information indicative of one or more factors that cause acceleration or deceleration of the own vehicle while the own vehicle is subjected to the acceleration/deceleration control. The vehicle control unit includes a setting unit configured to set, based on the factor information, at least one of a maximum level of deceleration and a maximum level of acceleration. The maximum level of deceleration represents a maximum rate of reduction in a speed of the own vehicle during deceleration of the own vehicle. The maximum level of acceleration represents a maximum rate of increase in the speed of the own vehicle during acceleration of the own vehicle. The vehicle control apparatus includes an acceleration/deceleration control unit configured to have at least one of (i) a first function of performing deceleration control of the own vehicle using the maximum level of deceleration as an upper limit for the deceleration control, and (ii) a second function of performing acceleration control of the own vehicle using the maximum level of acceleration as an upper limit for the acceleration control.

Specifically, the first aspect of the present disclosure sets, based on the factor information, at least one of the maximum level of deceleration and the maximum level of acceleration. Then, the first aspect of the present disclosure performs (i) deceleration control of the own vehicle using the maximum level of deceleration as the upper limit for the deceleration control, and/or (ii) acceleration control of the own vehicle using the maximum level of acceleration as the upper limit for the acceleration control.

This configuration of the first aspect enables suitably controlled deceleration and/or suitably controlled acceleration of the own vehicle based on each factor of the factor information, making it possible to reduce (i) the occurrence of a forcibly sudden deceleration of a rearward vehicle due to the deceleration of the own vehicle and (ii) the occurrence of unexpected situations, such as a situation that causes a driver of the own vehicle to feel a sense of danger.

The present disclosure provides, as a second aspect, a processor-readable vehicle control program product for causing a processor to execute acceleration/deceleration control of an own vehicle traveling in a lane as an own lane. The processor-readable vehicle control program product includes a storage media, and a set of computer-program instructions stored in the storage media. The computer-program instructions cause a processor to execute the following steps of:

(I) Acquiring factor information indicative of one or more factors that cause acceleration or deceleration of the own vehicle while the own vehicle is subjected to the acceleration/deceleration control (II) Setting, based on the factor information, at least one of a maximum level of deceleration and a maximum level of acceleration, the maximum level of deceleration representing a maximum rate of reduction in a speed of the own vehicle during deceleration of the own vehicle, the maximum level of acceleration representing a maximum rate of increase in the speed of the own vehicle during acceleration of the own vehicle (III) Performing at least one of deceleration control of the own vehicle using the maximum level of deceleration as an upper limit for the deceleration control, and acceleration control of the own vehicle using the maximum level of acceleration as an upper limit for the acceleration control.

This configuration of the second aspect enables suitably controlled deceleration and/or suitably controlled acceleration of the own vehicle based on each factor of the factor information, making it possible to reduce (i) the occurrence of a forcibly sudden deceleration of a rearward vehicle due to the deceleration of the own vehicle and (ii) the occurrence of unexpected situations, such as a situation that causes a driver of the own vehicle to feel a sense of danger.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

First Embodiment

A vehicle control apparatus 10 according to the first embodiment is used to be installed in an own vehicle and has an adaptive cruise control (ACC) function that performs tracking control. The tracking control causes the vehicle to track a target preceding vehicle traveling in a traveling course of the own vehicle in front thereof.

Figure 1:
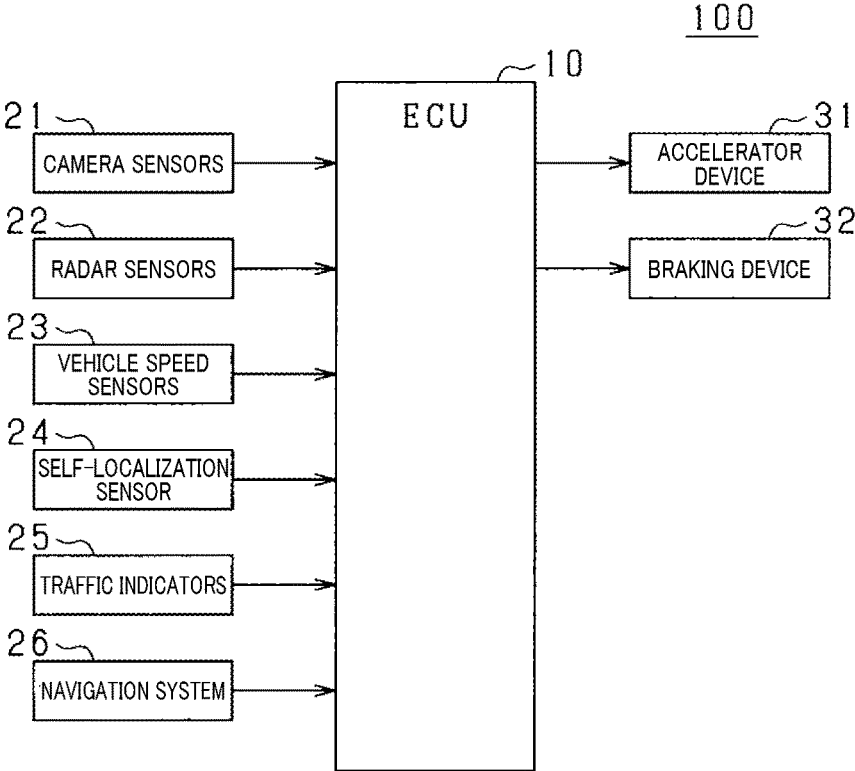
FIG. 1 is a block diagram schematically illustrating a vehicle control apparatus according to the first embodiment.

First, the following describes a control system for the own vehicle with reference to FIG. 1.

The control system includes a plurality of camera sensors 21, a plurality of radar sensors 22, a plurality of vehicle speed sensors 23, a self-localization sensor 24, traffic indicators 25, a navigation system 26, and an ECU 10 serving as the vehicle control apparatus 10.

Each of the camera sensors 21 is comprised of, for example, a CCD camera, a CMOS image sensor, or a near-infrared camera. Each camera sensor 21 can be configured as a monocular camera or a stereo camera.

The camera sensors 21 according to the first embodiment include a forward camera, a rearward camera, and at least first and second sideward cameras.

The forward camera is mounted to, for example, the center of the upper end of the front windshield of the own vehicle in the vehicle-width direction at a predetermined height. The forward camera is configured to capture images of a predetermined forward field of view of the own vehicle; the forward field of view has a predetermined angle of view.

The rearward camera is mounted to, for example, the center of the upper end of the rear windshield of the own vehicle in the vehicle-width direction at a predetermined height. The rearward camera is configured to capture images of a predetermined angular rearward field of view of the own vehicle; the rearward field of view has a predetermined angle of view.

The first sideward camera is mounted to, for example, a predetermined left-side portion of the body of the own vehicle; the predetermined left-side portion is for example adjacent to the left-side front door or the left-side rear door of the own vehicle. The first sideward camera is configured to capture images of a predetermined angular left-sideward field of view of the own vehicle; the left-sideward field of view has a predetermined angle of view.

The second sideward camera is mounted to, for example, a predetermined right-side portion of the body of the own vehicle; the predetermined right-side portion is for example adjacent to the right-side front door or the right-side rear door of the own vehicle. The second sideward camera is configured to capture images of a predetermined angular right-sideward field of view of the own vehicle; the right-sideward field of view has a predetermined angle of view.

The camera sensors 21 can be configured to monitor, based on their captured images, various surrounding information items around the own vehicle; the various surrounding information items include, for example, (i) moving objects, such as other vehicles and/or pedestrians, (ii) carriageway markings, such as while lines, on road surfaces, (iii) information on red lights of traffic signals in intersections, (iv) traffic signs, such as pedestrian crossings and speed limits, and (v) various traffic signs on road surfaces.

Each radar sensor 22 is configured to detect objects located around the own vehicle using directional probe waves or directional electromagnetic waves, such as millimeter waves or laser light.

The radar sensors 22 according to the first embodiment are mounted to the front end, rear end, left- and right-side ends of the body of the own vehicle, respectively. Each radar sensor 22 is configured to scan a predetermined region around the own vehicle using a radar signal every predetermined time, so that the radar sensors 22 scan the own vehicle's surroundings using their radar signals every predetermined time. Each radar sensor 22 is additionally configured to receive echoes resulting from reflection of the scanned radar signals by the outer surface of at least one object located in the corresponding scanning region, so that the radar sensors 22 detect, based on the received echoes, information on objects located around the own vehicle; the information on each object located around the own vehicle, which will also be referred to as object information, can include, for example, (i) a distance of the corresponding object relative to the own vehicle and (ii) a relative speed of the corresponding object relative to the own vehicle.

If a target preceding vehicle is traveling in front of the own vehicle, the radar sensors 22 can detect information, i.e., preceding-vehicle information, on, for example, (i) a safe distance from the target preceding vehicle to the own vehicle, (ii) a relative speed of the target preceding vehicle relative to the own vehicle, and (iii) a relative acceleration of the target preceding vehicle relative to the own vehicle. The detected object information, i.e., the detected target preceding-vehicle information, is inputted to the ECU 10.

The vehicle speed sensors 23 are each mounted to, for example, the corresponding wheel of the own vehicle to accordingly measure the rotational speed of the corresponding wheel, making it possible to acquire a measurement signal indicative of the speed of the own vehicle. The measurement signal of each vehicle speed sensor 23 is inputted to the ECU 10.

The self-localization sensor 24 is configured to measure information on a current location of the own vehicle. For example, the self-localization sensor 24 is comprised of one or more GPS receivers and/or one or more gyro sensors. The measured information on the current location of the own vehicle is inputted to the ECU 10.

When operated by the driver of the own vehicle, each traffic indicator 25 is configured to output, to the ECU 10, a corresponding one of left-turn and right-turn signals.

The navigation system 26 is configured to calculate, for example, the current location of the own vehicle based on GPS signals received by the one or more GPS receivers. The navigation system 26 is configured to search one or more routes from the current location of the own vehicle to a selected destination, and/or guide the own vehicle along a selected route from the current location of the own vehicle to the selected destination. The navigation system 26 can be configured to receive traffic road information transmitted from one or more unillustrated servers to accordingly acquire, from the traffic road information, road curves and/or the width of a road, which will be referred to as a current traveling road, on which the own vehicle is traveling. The navigation system 26 can be configured to use one or more road databases to accordingly acquire information indicative of the localizations of intersections and/or localizations of traffic signals located on the current traveling road. Various items of information acquired by the navigation system 26 are inputted to the ECU 10.

The own vehicle includes an accelerator device 31 and a braking device 32. The accelerator device 31 is comprised of, for example, a motor or an engine that accelerates the own vehicle. The braking device 32 is comprised of, for example, a hydraulic or electric braking device that decelerates the own vehicle.

The ECU 10 is comprised of one or more known microcomputers that include, for example, one or more CPUs, one or more ROMs, one or ore RAMs, one or more flash memories The ECU 10 refers to one or more computer programs and control data stored in at least one of the above memories to accordingly perform the tracking control of causing the own vehicle to track a target preceding vehicle traveling ahead of the own vehicle. The tracking control is configured to set a target speed of the own vehicle, and cause the own vehicle to follow the target preceding vehicle while limiting the speed of the own vehicle to be lower than or equal to the target speed as an upper limit.

The ECU 10 is configured to recognize, based on the surrounding information inputted from the camera sensors 21, a vehicle traveling ahead of the own vehicle as a target preceding vehicle. Then, the ECU 10 is configured to control acceleration and/or deceleration of the own vehicle to accordingly maintain a safe distance from the own vehicle to the target preceding vehicle to a predetermined distance. That is, the ECU 10 is configured to adaptively instruct (i) the accelerator device 31 to accelerate the own vehicle and (ii) the braking device 32 to decelerate the own vehicle to implement acceleration/deceleration control of the own vehicle.

Additionally, during execution of the tracking control, the ECU 10 is configured to determine, when the own vehicle is about to change from an own lane of the own vehicle to an adjacent lane as a lane-change destination, which is adjacent to the own lane, whether there is an alternative vehicle traveling in the adjacent lane in front of the own vehicle. Then, in response to determination that there is an alternative vehicle traveling in the adjacent lane in front of the own vehicle, the ECU 10 is configured to continue, after change of the own lane to the adjacent lane, the tracking control using the alternative vehicle as a new target preceding vehicle as the tracking target of the tracking control. In this case, the ECU 10 is configured to recognize a driver's lane-change command based on the right-turn or left-turn signal from the corresponding traffic indicator 25 to accordingly perform the switch from the present target preceding vehicle to the new target preceding vehicle for the tracking control. When changing the present own lane to an adjacent lane adjacent to the own lane, the ECU 10 is configured to adaptively decelerate the own vehicle to accordingly adjust a safe distance from the own vehicle to the new target preceding vehicle in the adjacent lane.

Deceleration of the own vehicle during the lane change may result in an unexpected situation, such as a situation that may force a rear vehicle traveling to the rear of the own vehicle on the changed adjacent lane to perform sudden deceleration if the rear vehicle did not expect the deceleration of the own vehicle.

Figure 2:
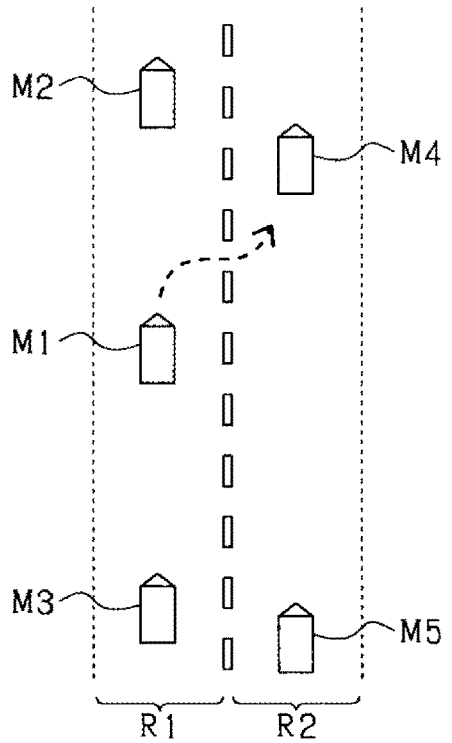
FIG. 2 is a view illustrating an exemplary traffic scene of an own vehicle according to the first embodiment.

The following describes an exemplary traffic scene in which such an unexpected situation occurs with reference to FIG. 2. The traffic scene illustrated in FIG. 2 shows a two-lane section of a four-lane road. Reference character R1 represents the left lane, and reference character R2 represents the right lane. On the left lane R1, the own vehicle, which will be referred to as M1, a directly forward vehicle M2, and a direct rearward vehicle M3 are traveling. The directly forward vehicle M2 is traveling directly ahead of the own vehicle M1, and the direct rearward vehicle M3 is traveling directly behind the own vehicle M1. On the right lane R2, a forward adjacent vehicle M4 is traveling in a forward adjacent area of the own vehicle M1, and a rearward adjacent vehicle M5 is traveling in a rearward adjacent area of the own vehicle M1. That is, the left lane R1 in FIG. 2 shows the own lane of the own vehicle M1, and the right lane R2 in FIG. 2 shows the adjacent lane of the own lane.

FIG. 2 shows that the tracking control is carried out in the own vehicle M1, which causes the own vehicle M1 to track the directly forward vehicle M2 as a target preceding vehicle for the tracking control. In this situation, deceleration control of the own vehicle M1 is carried out in response to deceleration of the directly forward vehicle M2.

When the own vehicle M1 makes a lane change from the own lane, i.e., the left lane R1, to the adjacent lane, i.e., the right lane R2, the target preceding vehicle, which is the tracking target of the tracking control, is switched from the directly forward vehicle M2 to the forward adjacent vehicle M4. Due to the switching, speed control is carried out in the own vehicle M1 in accordance with a safe distance from the own vehicle M1 to the forward adjacent vehicle M4. For example, when the speed of the forward adjacent vehicle M4 is lower than the speed of the directly forward vehicle M2, sudden deceleration of the own vehicle is carried out. Similarly, when the safe distance from the own vehicle M1 to the forward adjacent vehicle M4 is smaller than the safe distance from the own vehicle M1 to the directly forward vehicle M2, sudden deceleration of the own vehicle is carried out. This sudden deceleration of the own vehicle may result in an unexpected situation that may force the rearward adjacent vehicle M5 to perform sudden deceleration.

While the own vehicle is traveling, other scenes may cause the own vehicle to decelerate in addition to the lane-change scene set forth above. For example, a first exemplary scene where a forward section of the own road is curved may cause the own vehicle to decelerate. Similarly, a second exemplary scene where the forward section of the own road become narrowed in width due to a decrease in the number of lanes may cause the own vehicle to decelerate. Additionally, a third exemplary scene where a traffic light in an intersection located in a forward direction of the own vehicle is red may cause the own vehicle to decelerate. A fourth exemplary scene where there is a pedestrian crossing in the forward direction of the own vehicle is red may cause the own vehicle to decelerate. A fifth exemplary scene where a traffic sign located in the forward direction of the own vehicle represents "REDUCE SPEED" may cause the own vehicle to decelerate.

Deceleration of the own vehicle due to, for example, any one of the above first to fifth exemplary scenes, which is unexpected by a rearward vehicle traveling directly behind the own vehicle, may result in an unexpected situation that may force the rearward vehicle to perform sudden deceleration.

From these viewpoints, the vehicle control apparatus 10, i.e., the ECU 10, of the first embodiment is configured to acquire factor information indicative of one or more factors that cause deceleration of the traveling own vehicle while the own vehicle is subjected to acceleration/deceleration control, and determine, based on the factor information, a maximum level of deceleration that represents the maximum rate of reduction in the speed of the own vehicle during deceleration, i.e., slow-down, of the own vehicle.

Then, the vehicle control apparatus 10, i.e., the ECU 10, of the first embodiment is configured to perform deceleration control of the own vehicle using the maximum level of deceleration as an upper limit for the deceleration control. Assuming that a level of acceleration is defined as a level of acceleration in a positive direction, i.e., a speed increase direction, so that a level of deceleration is defined as a level of acceleration in a negative direction, i.e., a speed decrease direction. That is, the maximum level of deceleration is defined as the maximum level of acceleration in the negative direction.

Figure 3:
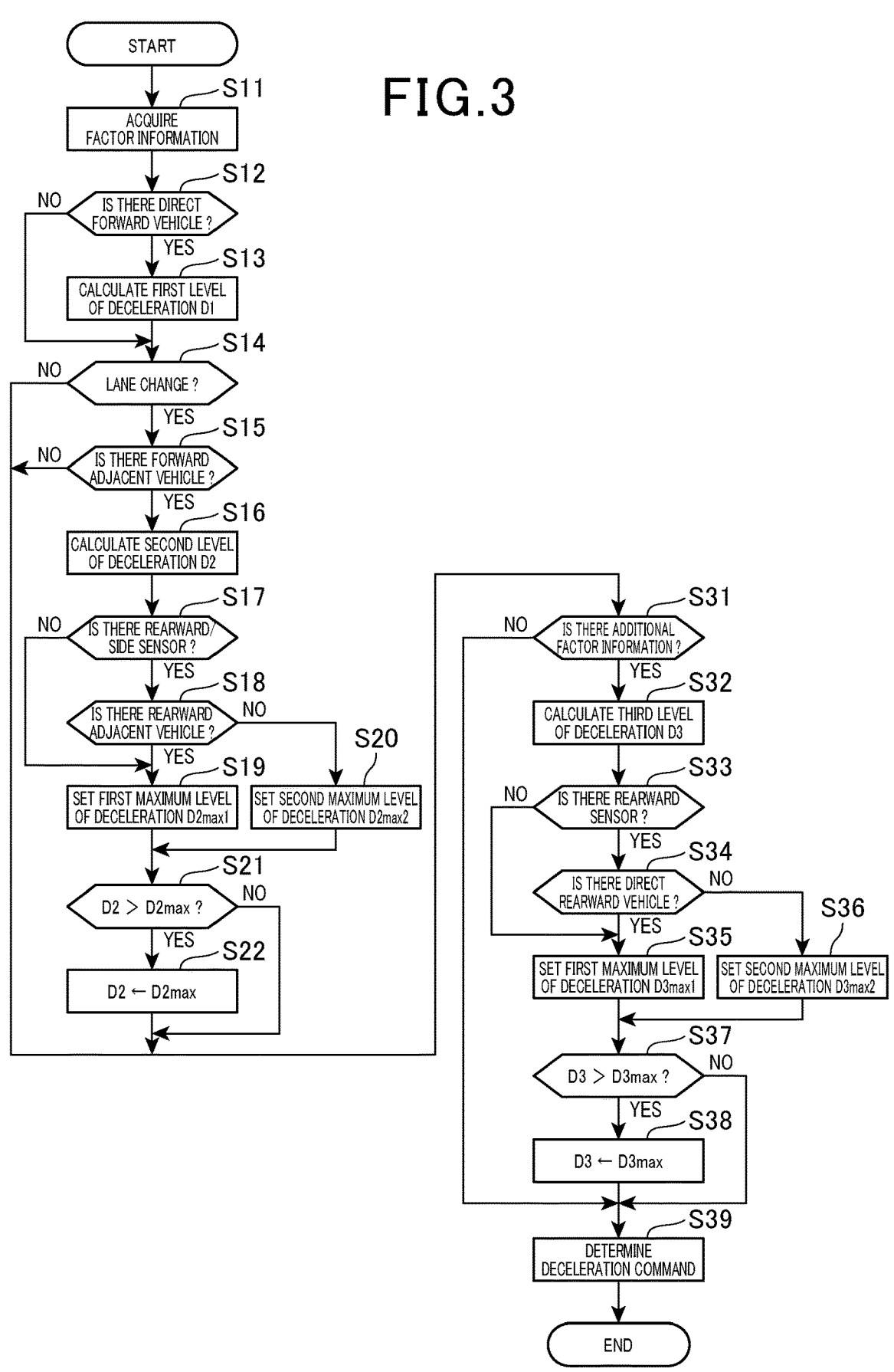
FIG. 3 is a is a flowchart illustrating an acceleration/deceleration control routine of the first embodiment.

FIG. 3 is a flowchart illustrating an acceleration/deceleration control routine of the first embodiment. The ECU 10 is programmed to iterate the acceleration/deceleration control routine illustrated in FIG. 3 every predetermined cycle while executing the tracking control, i.e., the ACC function.

In step S11 of the acceleration/deceleration control routine, the ECU 10 acquires factor information indicative of one or more factors that cause deceleration of the traveling own vehicle. Specifically, the factor information for example includes (i) whether there is a forward adjacent vehicle traveling in a forward adjacent area on an adjacent lane that is adjacent to the own lane and (ii) various types of traffic information. The various types of traffic information include, for example, road-shape information, intersection information, and/or traffic sign information.

The road-shape information includes, for example, information on whether the forward section of the own road is curved and information on the width of the own road. The intersection information includes, for example, information on whether a traffic light in one or more intersections located in the forward direction of the own vehicle is red. The traffic sign information includes, for example, information on pedestrian crossings and information on speed-limit signs located in the forward direction of the own vehicle. The ECU 10 can acquire the factor information from the camera sensors 21 and/or the navigation system 26.

In subsequent steps from step S11, the ECU 10 calculates a first level of deceleration D1, a second level of deceleration D2, and a third level of deceleration D3 in accordance with the traveling situations of the own vehicle, and calculates, at this point of time, a deceleration command for the own vehicle in accordance with the first to third levels of deceleration D1 to D3.

Specifically, the operations in steps S12 and S13 calculate the first level of deceleration D1, the operations in steps S14 to S22 calculate the second level of deceleration D2, and the operations in steps S31 to S38 calculate the third level of deceleration D3.

The following describes, in detail, how the ECU 10 calculates the first, second, and third levels of deceleration D1, D2, and D3.

In step S12, the ECU 10 determines whether a target preceding vehicle is traveling in front of the own vehicle in the own lane as a tracking target. Assuming that the directly forward vehicle M2 is traveling in front of the own vehicle M1 and the tracking control has been being carried out using the directly forward vehicle M2 as the tracking target (see FIG. 2), the determination in step S12 is affirmative.

In response to determination that a target preceding vehicle, i.e., the directly forward vehicle M2, is traveling in front of the own vehicle M1 as the tracking target (YES in step S12), the acceleration/deceleration control routine proceeds to step S13. In step S13, the ECU 10 calculates a level of deceleration of the own vehicle M1 with respect to the directly forward vehicle M2 as the first level of deceleration. For example, in a situation where the safe distance from the own vehicle to the directly forward vehicle M2 becomes smaller, the ECU 10 calculates the first level of deceleration D1 that slows down the speed of the own vehicle M1. At that time, the ECU 10 calculates the first level of deceleration D1 such that the first level of deceleration D1 becomes larger to accordingly increase a degree of delectation of the own vehicle M1 as the safe distance from the own vehicle M1 to the directly forward vehicle M2 becomes smaller.

Otherwise, in response to determination that no target preceding vehicle, i.e., no directly forward vehicle M2, is traveling in front of the own vehicle M1 (NO in step S12), the acceleration/deceleration control routine proceeds to step S14 while skipping the operation in step S13 without calculation of the first level of deceleration D1.

The operations in steps S14 to S22 calculate, in a case where the own vehicle M1 is about to make a lane change from the own lane to an adjacent lane as a lane-change destination, which is adjacent to the own lane, the second level of deceleration D2 based on one or more other vehicles traveling in the adjacent lane. As illustrated in FIG. 2, let us assume a case where the own vehicle M1 is about to make a lane change from the own lane to the right lane R2 as the adjacent lane while the forward adjacent vehicle M4 and the rearward adjacent vehicle M5 are traveling in the right lane R2. In this assumption, the operations in steps S14 to S22 select the forward adjacent vehicle M4 as a new target preceding vehicle, and calculate a level of deceleration for of own vehicle M1 with respect to the forward adjacent vehicle M4 as the second level of deceleration D2. The operations in steps S14 to S22 set a first maximum level of deceleration D2max1 or a second maximum level of deceleration D2max2, and guard the second level of deceleration D2 from exceeding the first maximum level of deceleration D2max1 or the second maximum level of deceleration D2max2 to accordingly implement a limitation of deceleration of the own vehicle M1.

The following describes, in detail, the operation in each of steps S14 to S22.

In step S14, the ECU 10 determines whether there is a driver's lane-change command. Specifically, the ECU 10 determines whether the ECU 10 is receiving the right-turn or left-turn signal from the corresponding traffic indicator 25, and determines that there is a driver's lane-change command (YES in step S14) upon determination that the ECU 10 is receiving the right-turn or left-turn signal from the corresponding traffic indicator 25. In response to affirmative determination in step S14, the acceleration/deceleration control routine proceeds to step S15.

In step S15, the ECU 10 determines whether the forward adjacent vehicle M4 is in the adjacent lane as the lane-change destination. In response to determination that the forward adjacent vehicle M4 is in the adjacent lane as the lane-change destination (YES in step S15), the acceleration/deceleration control routine proceeds to step S16.

In step S16, the ECU 10 calculates the second level of deceleration D2. Specifically, the ECU 10 calculates the second level of deceleration D2 that slows down the speed of the own vehicle M1 in accordance with a safe distance from the own vehicle M1 to the forward adjacent vehicle M4. In particular, the ECU 10 calculates the second level of deceleration D2 that slows down the speed of the own vehicle M1 in accordance with a safe distance from the own vehicle M1 to the forward adjacent vehicle M4 in the straightforward direction of the own vehicle M1. At that time, the ECU 10 calculates the second level of deceleration D2 such that the second level of deceleration D2 becomes larger to accordingly increase a degree of delectation of the own vehicle M1 as the safe distance from the own vehicle M1 to the forward adjacent vehicle M4 becomes smaller.

Otherwise, in response to determination that there is no driver's lane-change command (NO in step S14) or that no forward adjacent vehicle is in the adjacent lane as the lane-change destination (NO in step S15), the acceleration/deceleration control routine proceeds to step S31 while skipping the operations in steps S16 to S22 without calculation of the second level of deceleration D2.

Following the operation in step S16, the ECU 10 determines whether at least one rearward/side sensor, such as at least one of the camera sensors 21 and radar sensors 22, which has a rearward and side detection region around the own vehicle M1, is mounted to the own vehicle M1 in step S17. In response to determination that at least one rearward/side sensor is mounted to the own vehicle M1 (YES in step S17), the acceleration/deceleration control routine proceeds to step S18.

In step S18, the ECU 10 determines whether the rearward adjacent vehicle M5 is in the adjacent lane as the lane-change destination. In response to determination that the rearward adjacent vehicle M5 is in the adjacent lane as the lane-change destination (YES in step S18), the acceleration/deceleration control routine proceeds to step S19.

In step S19, the ECU 10 sets the first maximum level of deceleration D2max1 for the second level of deceleration D2. The first maximum level of deceleration D2max1 represents an upper limit for the second level of deceleration D2 that is a level of deceleration of the own vehicle M1 with respect to the forward adjacent vehicle M4. The first maximum level of deceleration D2max1 can be set to a predetermined fixed level.

Otherwise, in response to determination that no rearward/side sensor is mounted to the own vehicle M1 (NO in step S17), the acceleration/deceleration control routine proceeds to step S19 while skipping the operation in step S18. In step S19, the ECU 10 sets the first maximum level of deceleration D2max1 for the second level of deceleration D2. That is, in response to determination that no rearward/side sensor is mounted to the own vehicle M1 (NO in step S17), the ECU 10 sets the first maximum level of deceleration D2max1 for the second level of deceleration D2 independently of whether the rearward adjacent vehicle M5 is in the adjacent lane as the lane-change destination is detected.

Additionally, in response to determination that no rearward adjacent vehicle is in the adjacent lane as the lane-change destination (NO in step S18), the acceleration/deceleration control routine proceeds to step S20.

In step S20, the ECU 10 sets the second maximum level of deceleration D2max2 for the second level of deceleration D2. Like the first maximum level of deceleration D2max1, the second maximum level of deceleration D2max2 represents an upper limit for the second level of deceleration D2 that is a level of deceleration of the own vehicle M1 with respect to the forward adjacent vehicle M4. The second maximum level of deceleration D2max2 can be set to a predetermined fixed level.

In particular, the first and second maximum levels of deceleration D2max1 and D2max2 are determined such that the first maximum level of deceleration D2max1 is smaller than the second maximum level of deceleration D2max2. This enables the degree of limitation on deceleration of the own vehicle M1 in a first case where it is determined that the rearward adjacent vehicle M5 is present to be larger than that in a second case where it is determined that no rearward adjacent vehicle is present.

Following the operation in step S19 or S20, the ECU 10 determines whether the second level of deceleration D2 is larger than a maximum level of deceleration D2max that is defined as one of the first maximum level of deceleration D2max1 and the second maximum level of deceleration D2max2 in step S21.

In response to determination that the second level of deceleration D2 is larger than the maximum level of deceleration D2max, i.e., one of the first maximum level of deceleration D2max1 and the second maximum level of deceleration D2max2 (YES in step S21), the ECU 10 switches the second level of deceleration D2 to a corresponding one of the first maximum level of deceleration D2max1 and the second maximum level of deceleration D2max2 in step S22. Otherwise, in response to determination that the second level of deceleration D2 is not larger than the maximum level of deceleration D2max, i.e., one of the first maximum level of deceleration D2max1 and the second maximum level of deceleration D2max2 (NO in step S21), the acceleration/deceleration control routine proceeds to step S31 while skipping the operation in step S22. This enables the second level of deceleration D2 to be limited by any one of the first maximum level of deceleration D2max1 and the second maximum level of deceleration D2max2.

The first maximum level of deceleration D2max1 or the second maximum level of deceleration D2max2 is set for the second level of deceleration D2. This results in deceleration of the own vehicle M1 based on the second level of deceleration D2 being limited to be smaller than or equal to the first maximum level of deceleration D2max1 or the second maximum level of deceleration D2max2.

In contrast, no maximum level of deceleration is set for the first level of deceleration D1, so that no limitation is imposed on the first level of deceleration D1. This results in the first level of deceleration D1 being freely determined. This makes it possible to set the maximum level of deceleration of the own vehicle when the own vehicle makes lane changes to be smaller than the maximum level of deceleration of the own vehicle when the own vehicle does not make a lane change. In other words, the degree of limitation on deceleration of the own vehicle when the own vehicle makes a lane change can be larger than the degree of limitation on deceleration of the own vehicle when the own vehicle does not make a lane change.

The operations in steps S31 to S38 calculate, in a case where the traffic information that includes at least one of the road-shape information, the intersection information, and the traffic-sign information is acquired as the factor information, the third level of deceleration D3 based on the traffic information. For example, if the road-shape information including that a forward section of the own road is curved is acquired as the traffic information or the road-shape information including the width of a forward section of the own road is acquired as the traffic information, the operations in steps S31 to S38 calculate the third level of deceleration D3. As another example, if the intersection information including a traffic light in an intersection located at a forward section of the own vehicle is red is acquired as the traffic information, the operations in steps S31 to S38 calculate the third level of deceleration D3. As a further example, if the traffic-sign information including pedestrian crossings and/ or speed-limit signs are acquired as the traffic information, the operations in steps S31 to S38 calculate the third level of deceleration D3.

The operations in steps S31 to S38 set a first maximum level of deceleration D3max1 or a second maximum level of deceleration D3max2, and guard the third level of deceleration D3 from exceeding the first maximum level of deceleration D3max1 or the second maximum level of deceleration D3max2 to accordingly implement a limitation of deceleration of the own vehicle M1.

The following describes, in detail, the operation in each of steps S31 to S38.

In step S31, the ECU 10 determines whether the traffic information including at least one of the road-shape information, the intersection information, and the traffic-sign information is acquired as the factor information. In response to determination that the traffic information including at least one of the road-shape information, the intersection information, and the traffic-sign information is acquired as the factor information (YES in step S31), the acceleration/ deceleration control routine proceeds to step S32.

In step S32, the ECU 10 calculates the third level of deceleration D3 in accordance with the acquired traffic information.

The following describes, in detail, how the ECU 10 calculates the third level of deceleration D3.

If the road-shape information including the forward section of the own road is curved is acquired as the traffic information, the ECU 10 calculates the third level of deceleration D3 that slows down the speed of the own vehicle M1 in accordance with the curvature of the curved forward section of the own road. At that time, the ECU 10 calculates the third level of deceleration D3 such that the third level of deceleration D3 becomes larger as the curvature of the curved forward section of the own road becomes larger. If the road-shape information including the width of the forward section of the own road is acquired as the traffic information, the ECU 10 calculates the third level of deceleration D3 that slows down the speed of the own vehicle M1 in accordance with a decrease in the width of the forward section of the own road. At that time, the ECU 10 calculates the third level of deceleration D3 such that the third level of deceleration D3 becomes larger as the degree of decrease in the width of the forward section of the own road becomes larger.

If the intersection information including a traffic light in an intersection located at a forward section of the own vehicle is red is acquired as the traffic information, the ECU 10 calculates, based on the intersection information on the red signal of the traffic light, the third level of deceleration D3 that stops the own vehicle M1 before the stop line. If the traffic-sign information including a traffic sign indicative of a pedestrian crossing on a forward section of the own road is acquired as the traffic information, the ECU 10 calculates, based on the traffic sign indicative of the pedestrian crossing, the third level of deceleration D3 that stops the own vehicle M1 before the traffic sign indicative of the pedestrian crossing. If the traffic-sign information including a speed-limit sign is acquired as the traffic information, the ECU 10 determines whether the speed of the own vehicle is higher than or equal to a speed limit of the speed-limit sign, and calculates, upon determination that the speed of the own vehicle is higher than or equal to the speed limit of the speed-limit sign, the third level of deceleration D3 that causes the speed of the own vehicle to be lower than or equal to the speed limit of the speed-limit sign.

Otherwise, in response to determination that no traffic information is acquired (NO in step S31), the acceleration/ deceleration control routine proceeds to step S39 while skipping the operations in steps S32 to S38, i.e., without calculation of the third level of deceleration D3.

Following the operation in step S32, which calculates the third level of deceleration D3, the ECU 10 determines whether at least one rearward sensor, such as at least one of the camera sensors 21 and radar sensors 22, which has a rearward detection field around the own vehicle M1, is mounted to the own vehicle M1 in step S33. In response to determination that at least one rearward sensor is mounted to the own vehicle M1 (YES in step S33), the acceleration/ deceleration control routine proceeds to step S34.

In step S34, the ECU 10 determines whether the direct rearward vehicle M3 is in the own lane. In response to determination that the direct rearward vehicle M3 is in the own lane (YES in step S34), the acceleration/deceleration control routine proceeds to step S35.

In step S35, the ECU 10 sets the first maximum level of deceleration D3max1 for the third level of deceleration D3. The first maximum level of deceleration D3max1 represents an upper limit for the third level of deceleration D3 that is a level of deceleration of the own vehicle M1 based on the traffic information. The first maximum level of deceleration D3max1 can be set to a predetermined fixed level.

The first maximum level of deceleration D3max1 can be preferably set to be larger than the first maximum level of deceleration D2max1 for a case where the forward adjacent vehicle M4 is in the lane-change destination during lane change. This results in the degree of limitation on deceleration of the own vehicle based on the traffic information being smaller than the degree of limitation on deceleration of the own vehicle when the own vehicle makes a lane change.

That is, the degree of limitation on deceleration of the own vehicle when the own vehicle does not make a lane change and a directly forward vehicle is present in front of the own vehicle will be referred to as a first degree of deceleration, the degree of limitation on deceleration of the own vehicle during lane change will be referred to as a second degree of limitation, and the degree of limitation on deceleration of the own vehicle based on the traffic information will be referred to as a third degree of limitation on deceleration of the own vehicle based on the traffic information. At that time, the second degree of limitation is larger than the third degree of limitation, and the third degree of limitation is larger than the first degree of limitation.

Otherwise, in response to determination that no rearward sensor is mounted to the own vehicle M1 (NO in step S33), the acceleration/deceleration control routine proceeds to step S35 while skipping the operation in step S34. In step S35, the ECU 10 sets the first maximum level of deceleration D3max1 for the third level of deceleration D3. That is, in response to determination that no rearward sensor is mounted to the own vehicle M1 (NO in step S33), the ECU 10 sets the first maximum level of deceleration D3max1 for the third level of deceleration D3 independently of whether the direct rearward vehicle M3 is present in the adjacent lane as the lane-change destination is detected.

Additionally, in response to determination that no direct rearward vehicle is in the own lane (NO in step S34), the acceleration/deceleration control routine proceeds to step S36.

In step S36, the ECU 10 sets the second maximum level of deceleration D3max2 for the third level of deceleration D3. Like the first maximum level of deceleration D3max1, the second maximum level of deceleration D3max2 represents an upper limit for the third level of deceleration D3 that is a level of deceleration of the own vehicle M1 based on the traffic information. The second maximum level of deceleration D3max2 can be set to a predetermined fixed level.

In particular, the first and second maximum levels of deceleration D3max1 and D3max2 are determined such that the first maximum level of deceleration D3max1 is smaller than the second maximum level of deceleration D3max2. This enables the degree of limitation on deceleration of the own vehicle M1 in a first case where it is determined that the direct rearward vehicle M3 is present to be larger than that in a second case where it is determined that no direct rearward vehicle is present.

Following the operation in step S35 or S36, the ECU 10 determines whether the third level of deceleration D3 is larger than a maximum level of deceleration D3max that is defined as one of the first maximum level of deceleration D3max1 and the second maximum level of deceleration D3max2 in step S37.

In response to determination that the third level of deceleration D3 is larger than the maximum level of deceleration D3max, i.e., one of the first maximum level of deceleration D3max1 and the second maximum level of deceleration D3max2 (YES in step S37), the ECU 10 switches the third level of deceleration D3 to a corresponding one of the first maximum level of deceleration D3max1 and the second maximum level of deceleration D3max2 in step S38. Otherwise, in response to determination that the third level of deceleration D3 is not larger than the maximum level of deceleration D3max, i.e., one of the first maximum level of deceleration D3max1 and the second maximum level of deceleration D3max2 (NO in step S37), the acceleration/deceleration control routine proceeds to step S39 while skipping the operation in step S38. This enables the third level of deceleration D3 to be limited by any one of the first maximum level of deceleration D3max1 and the second maximum level of deceleration D3max2.

Following the operation in step S38, the ECU 10 determines the deceleration command based on at least one of the first, second, and third levels of deceleration D1, D2, and D3 in step S39, so that deceleration of the own vehicle is performed based on the determined deceleration command.

Specifically, if all the first to third levels of deceleration D1 to D3 have been calculated, the ECU 10 can determine the largest one of the first to third levels of deceleration D1 to D3 as the deceleration command. Otherwise, if two of the first to third levels of deceleration D1 to D3 have been calculated, the ECU 10 can determine the larger one of the two levels of deceleration as the deceleration command. Otherwise, if only one of the first to third levels of deceleration D1 to D3 has been calculated, the ECU 10 can determine the calculated level of deceleration as the deceleration command.

The vehicle control apparatus 10, i.e., the ECU 10, of the first embodiment achieves the following excellent benefits.

Specifically, the vehicle control apparatus 10, i.e., the ECU 10, of the first embodiment is configured to determine, based on factor information indicative of one or more factors that cause deceleration of the traveling own vehicle, a maximum level of deceleration, and perform deceleration control of the own vehicle using the maximum level of deceleration as an upper limit for the deceleration control.

This configuration of the vehicle control apparatus 10 makes it possible to control the level of deceleration of the own vehicle in accordance with each factor causing deceleration of the own vehicle to accordingly reduce the occurrence of sudden deceleration of a rearward vehicle due to the deceleration of the own vehicle. This enables suitably controlled deceleration of the own vehicle.

The vehicle control apparatus 10 is configured to acquire, as the factor information, information indicative of whether a forward adjacent vehicle is in an adjacent lane as a lane-change destination of the own vehicle, and determines the maximum level of deceleration D2max with respect to the forward adjacent vehicle upon determination that the forward adjacent vehicle is in the adjacent lane as the lane-change destination of the own vehicle.

This configuration of the vehicle control apparatus 10 enables, when deceleration of the own vehicle is carried out due to deceleration of the forward adjacent vehicle, limitation on the deceleration of the own vehicle, making it possible to reduce the occurrence of a forcibly sudden deceleration of a rearward vehicle due to the deceleration of the own vehicle.

When the own vehicle makes a lane change, the vehicle control apparatus 10 may decelerate the own vehicle depending on deceleration of a forward adjacent vehicle in an adjacent lane as the lane-change destination of the own vehicle. In this case, the vehicle control apparatus is configured to set, on condition that the occurrence of a lane-change command for lane-change of the own vehicle, the first maximum level of deceleration D2max1 or the second maximum level of deceleration D2max2 of the own vehicle with respect to the forward adjacent vehicle. This configuration of the vehicle control apparatus 10 enables, when deceleration of the own vehicle is carried out depending on the speed of the forward adjacent vehicle, limitation on the deceleration of the own vehicle, making it possible to reduce the occurrence of a forcibly sudden deceleration of a rearward vehicle due to the deceleration of the own vehicle.

In a case of deceleration of the own vehicle without lane change, it is preferable not to impose limitation on deceleration of the own vehicle to avoid collision of the own vehicle with a directly forward vehicle traveling ahead of the own vehicle on the same own lane. In contrast, in a case of deceleration of the own vehicle for lane change, an increase in the degree of limitation on deceleration of the own vehicle is acceptable because of a lower possibility of collision of the own vehicle with a forward adjacent vehicle traveling in an adjacent lane as the lane-change destination. From these viewpoints, the vehicle control apparatus 10 is configured to set the maximum level of deceleration of the own vehicle such that the degree of limitation on deceleration of the own vehicle when the own vehicle makes a lane change is larger than that when the own vehicle does not make a lane change. This configuration of the vehicle control apparatus 10 makes it possible to perform suitable speed control of the own vehicle while factoring a possibility of collision of the own vehicle with the forward adjacent vehicle into the suitable speed control.

The vehicle control apparatus 10 is configured to set the first maximum level of deceleration D2max1 such that the degree of limitation on deceleration of the own vehicle upon determination that a rearward adjacent vehicle is in the adjacent vehicle is larger than that upon determination that no rearward adjacent vehicle is in the adjacent lane.

This configuration of the vehicle control apparatus 10 makes it possible to suitably set the degree of limitation on deceleration of the own vehicle with respect to the forward adjacent vehicle while factoring the presence of the rearward adjacent vehicle into the setting of the degree of limitation.

The vehicle control apparatus 10 is configured to calculate the first level of deceleration D1 with respect to a directly forward vehicle, the second level of deceleration D2 with respect to a forward adjacent vehicle, and the third level of deceleration D3 based on traffic information, and perform deceleration control of the own vehicle based on the largest one of the first to third levels of deceleration D1 to D3. This configuration of the vehicle control apparatus 10 makes it possible to perform suitable deceleration control of the own vehicle while reducing a possibility of collision of the own vehicle with the directly forward vehicle.

The vehicle control apparatus 10 is configured to acquire, as the factor information, traffic information including at least one of the road-shape information, the intersection information, and the traffic-sign information, and set the third level of deceleration D3 based on the traffic information. This configuration of the vehicle control apparatus 10 enables, during deceleration of the own vehicle based on the traffic information, limitation on deceleration of the own vehicle, making it possible to reduce the occurrence of a forcibly sudden deceleration of a rearward vehicle due to the deceleration of the own vehicle.

The vehicle control apparatus 10 is configured to set the first maximum level of deceleration D3max1 based on the traffic information such that the degree of limitation on deceleration of the own vehicle upon determination that a rearward adjacent vehicle is in the adjacent vehicle is larger than that upon determination that no rearward adjacent vehicle is in the adjacent lane.

This configuration of the vehicle control apparatus 10 makes it possible to suitably set, based on the traffic information, the degree of limitation on deceleration of the own vehicle with respect to the forward adjacent vehicle while factoring the presence of the rearward adjacent vehicle into the setting of the degree of limitation.

Second Embodiment

As described in the first embodiment, deceleration of the own vehicle may result in an unexpected situation, such as a situation that may force a rear vehicle traveling to the rear of the own vehicle on the changed adjacent lane to perform sudden deceleration if the rear vehicle did not expect the deceleration of the own vehicle.

Additionally, unexpected acceleration of the own vehicle that is controlled to track a target preceding vehicle due to, for example, unexpected acceleration of the target preceding vehicle may result in unexpected situation, such as a situation that may cause a driver of the own vehicle to feel a sense of danger.

Figure 4:
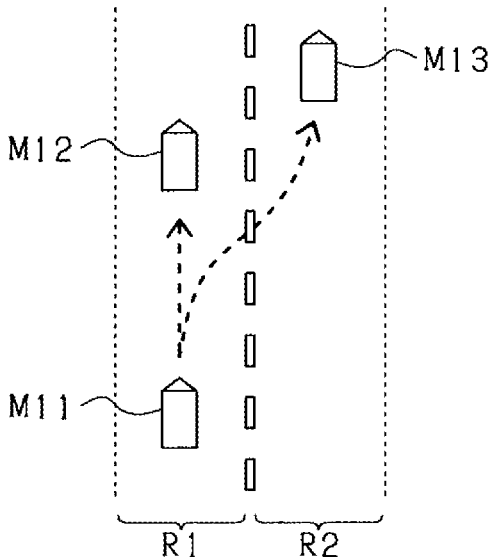
FIG. 4 is a view illustrating an exemplary traffic scene of the own vehicle according to the second embodiment.

The following describes an exemplary traffic scene in which such an unexpected situation occurs with reference to FIG. 4. The traffic scene illustrated in FIG. 4 shows a two-lane section of a four-lane road. Reference character R1 represents the left lane, and reference character R2 represents the right lane. On the left lane R1, the own vehicle, which will be referred to as M11, and a directly forward vehicle M12 are traveling. The directly forward vehicle M12 is traveling directly ahead of the own vehicle M11. On the right lane R2, a forward adjacent vehicle M13 is traveling in a forward adjacent area of the own vehicle M11.

FIG. 4 shows that the tracking control is carried out in the own vehicle M11, which causes the own vehicle M11 to track the directly forward vehicle M12 as a target preceding vehicle for the tracking control. In this situation, acceleration control of the own vehicle M11 is carried out in response to acceleration of the directly forward vehicle M12.

When the own vehicle M11 makes a lane change from the own lane, i.e., the left lane R1, to the adjacent lane, i.e., the right lane R2, the target preceding vehicle, which is the tracking target of the tracking control, is switched from the directly forward vehicle M12 to the forward adjacent vehicle M13. In this lane-change situation, the location of the forward adjacent vehicle M13 may cause the own vehicle M11 to accelerate in order to reduce the safe distance from the own vehicle M11 to the forward adjacent vehicle (target preceding vehicle) M13.

Lane change of the directly forward vehicle M12 or the own vehicle M11 that is controlled to track the directly forward vehicle M12 with the real speed lower than the target speed may cause the own vehicle M11 to accelerate based on the difference between the target speed and the real speed. For example, lane change of the directly forward vehicle M12 with the own vehicle M11 controlled to track the directly forward vehicle M12 causes the directly forward vehicle M12 to be excluded from the target preceding vehicle for the own vehicle M11, resulting in there being no target preceding vehicle for the own vehicle M11. The lost target preceding vehicle causes the own vehicle M11 to accelerate based on the difference between the target speed and the real speed.

Such acceleration of the own vehicle M11 due to at least one of the above factors may cause a driver of the own vehicle M11 to feel a sense of danger.

An increase in the target speed of the own vehicle M11, which is traveling at the real speed equal to the target speed without tracking the directly forward vehicle M12, causes the own vehicle M11 to accelerate based on the difference between the increased target speed and the real speed. This acceleration of the own vehicle M11 may cause a driver of the own vehicle M11 to feel a sense of danger.

From these viewpoints, the vehicle control apparatus 10, i.e., the ECU 10, of the second embodiment is configured to acquire factor information indicative of one or more factors that cause acceleration or deceleration of the traveling own vehicle while the own vehicle is subjected to acceleration/deceleration control, and determine, based on the factor information, a maximum level of acceleration that represents the maximum rate of increase in the speed of the own vehicle during acceleration, i.e., speed-up, of the own vehicle.

Then, the vehicle control apparatus 10, i.e., the ECU 10, of the second embodiment is configured to perform acceleration control of the own vehicle using the maximum level of acceleration as an upper limit for the acceleration control.

Figure 5:
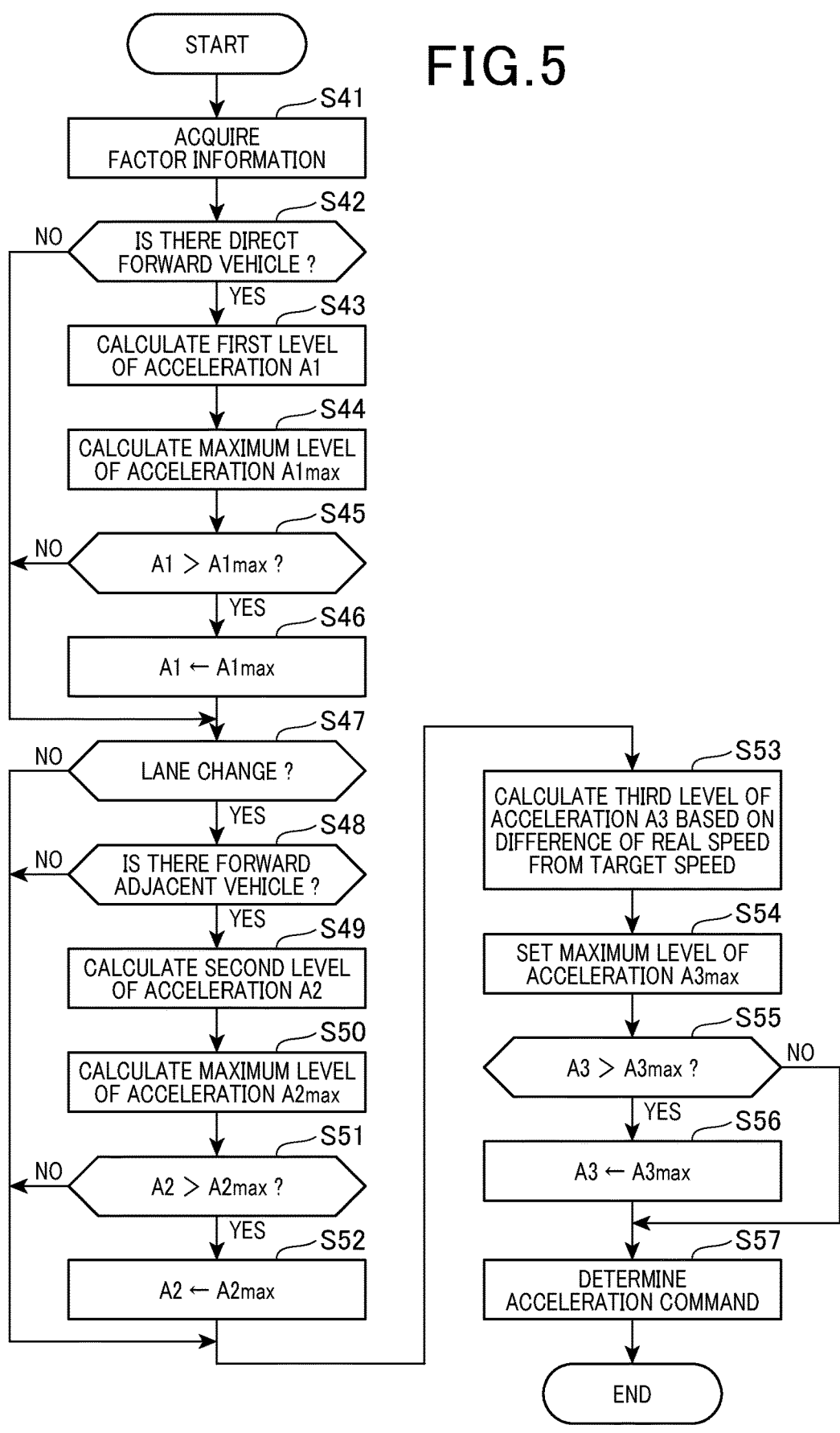
FIG. 5 is a flowchart illustrating an acceleration/deceleration control routine of the second embodiment.

FIG. 5 is a flowchart illustrating an acceleration/deceleration control routine of the second embodiment. The ECU 10 is programmed to iterate the acceleration/deceleration control routine illustrated in FIG. 5 in place of the acceleration/deceleration control routine illustrated in FIG. 3 every predetermined cycle. The ECU 10 can be programmed to iteratively execute the acceleration/deceleration control routine illustrated in FIG. 5 in concurrent with the acceleration/deceleration control routine illustrated in FIG. 3.

In step S41 of the acceleration/deceleration control routine, the ECU 10 acquires factor information indicative of one or more factors that cause acceleration or deceleration of the traveling own vehicle. The factor information for example includes (i) whether there is a directly forward vehicle traveling ahead of the own vehicle in the own lane, (ii) whether there is a forward adjacent vehicle traveling in a forward adjacent area on an adjacent lane that is adjacent to the own lane, and (iii) various types of traffic information. As described above, the various types of traffic information include, for example, the road-shape information, the intersection information, and/or the traffic sign information.

In subsequent steps from step S41, the ECU 10 calculates a first level of acceleration A1, a second level of acceleration A2, and a third level of acceleration A3 in accordance with the traveling situations of the own vehicle, and calculates, at this point of time, an acceleration command for the own vehicle in accordance with the first to third levels of acceleration A1 to A3.

Specifically, the operations in steps S42 to S46 calculate the first level of acceleration A1, the operations in steps S47 to S52 calculate the second level of acceleration A2, and the operations in steps S53 to S56 calculate the third level of acceleration A3.

The following describes, in detail, how the ECU 10 calculates the first, second, and third levels A1, A2, and A3 of acceleration.

First, the following describes the operations in steps S42 to S46 in detail.

In step S42, the ECU 10 determines whether a target preceding vehicle is traveling in front of the own vehicle in the own lane as a tracking target. Assuming that the directly forward vehicle M12 is traveling in front of the own vehicle M11 and the tracking control has been being carried out using the directly forward vehicle M12 as the tracking target (see FIG. 4), the determination in step S42 is affirmative.

In response to determination that a target preceding vehicle, i.e., the directly forward vehicle M12, is traveling in front of the own vehicle M11 as the tracking target (YES in step S42), the acceleration/deceleration control routine proceeds to step S43. In step S43, the ECU 10 calculates a level of acceleration of the own vehicle M11 with respect to the directly forward vehicle M12 as the first level of acceleration A1. For example, the ECU 10 calculates the first level of acceleration A1 based on the speed difference between the own vehicle M11 and the directly forward vehicle M12 and/or the safe distance therebetween.

Next, in step S44, the ECU 10 sets a maximum level of acceleration A1max for the first level of acceleration A1 based on the traffic information acquired in step S41 as the factor information. For example, if the road-shape information, i.e., curve information, including that a forward section of the own road is curved is acquired, the ECU 10 calculates the maximum level of acceleration A1max for the first level of acceleration A1 based on the curve information. The maximum level of acceleration A1max represents an upper limit for the first level of acceleration A1 that is a level of acceleration of the own vehicle M11 with respect to the directly forward vehicle M12. For example, the ECU 10 can calculate the maximum level of acceleration A1max that varies depending on the curvature of the curved forward section of the own road. The maximum level of acceleration A1max for the curved forward section of the own road can be set to a predetermined fixed level. Like the maximum level of acceleration A1max, each of maximum levels of acceleration A2max and A3max can be set to a variable or a fixed value.

Following the operation in step S44, the ECU 10 determines whether the first level of acceleration A1 is larger than the maximum level of acceleration A1max in step S45.

In response to determination that the first level of acceleration A1 is larger than the maximum level of acceleration A1max (YES in step S45), the ECU 10 switches the first level of acceleration A1 to the maximum level of acceleration A1max in step S46. This enables the first level of acceleration A1 to be limited by the maximum level of acceleration A1max. Otherwise, in response to determination that the first level of acceleration A1 is not larger than the maximum level of acceleration A1max (NO in step S45), the acceleration/deceleration control routine proceeds to step S47 while skipping the operation in step S46.

Otherwise, in response to determination that no directly forward vehicle M12 is traveling in front of the own vehicle M11 (NO in step S42), the acceleration/deceleration control routine proceeds to step S47 while skipping the operations in steps S43 to S46 without calculation of the first level of acceleration A1.

Next, the following describes the operations in steps S47 to S52 in detail.

In step S47, the ECU 10 determines whether there is a driver's lane-change command. Specifically, the ECU 10 determines whether the ECU 10 is receiving the right-turn or left-turn signal from the corresponding traffic indicator 25, and determines that there is a driver's lane-change command (YES in step S14) upon determination that the ECU 10 is receiving the right-turn or left-turn signal from the corresponding traffic indicator 25. In response to affirmative determination in step S47, the acceleration/deceleration control routine proceeds to step S48.

In step S48, the ECU 10 determines whether the forward adjacent vehicle M13 is in the adjacent lane as the lane-change destination. In response to determination that the forward adjacent vehicle M13 is in the adjacent lane as the lane-change destination (YES in step S48), the acceleration/deceleration control routine proceeds to step S49.

In step S49, the ECU 10 calculates the second level of acceleration A2 with respect to the forward adjacent vehicle M13. For example, the ECU 10 calculates the second level of acceleration A2 based on the speed difference between the own vehicle M11 and the forward adjacent vehicle M13 and/or the safe distance therebetween.

Next, in step S50, the ECU 10 sets a maximum level of acceleration A2max for the second level of acceleration A2 based on the traffic information acquired as the factor information. For example, if the road-shape information, i.e., curve information, including that a forward section of the own road is curved is acquired, the ECU 10 calculates the maximum level of acceleration A2max for the second level of acceleration A2 based on the curve information. The maximum level of acceleration A2max represents an upper limit for the second level of acceleration A2 that is a level of acceleration of the own vehicle M11 with respect to the forward adjacent vehicle M13.

Following the operation in step S50, the ECU 10 determines whether the second level of acceleration A2 is larger than the maximum level of acceleration A2max in step S51.

In response to determination that the second level of acceleration A2 is larger than the maximum level of acceleration A2max (YES in step S51), the ECU 10 switches the second level of acceleration A2 to the maximum level of acceleration A2max in step S52. This enables the second level of acceleration A2 to be limited by the maximum level of acceleration A2max. Otherwise, in response to determination that the second level of acceleration A2 is not larger than the maximum level of acceleration A2max (NO in step S51), the acceleration/deceleration control routine proceeds to step S53 while skipping the operation in step S52.

Otherwise, in response to determination that there is no driver's lane-change command (NO in step S47) or that no forward adjacent vehicle M13 is in the adjacent lane as the lane-change destination (NO in step S48), the acceleration/deceleration control routine proceeds to step S53 while skipping the operations in steps S49 to S52 without calculation of the second level of acceleration A2.

Next, the following describes the operations in steps S53 to S57 in detail.

In step S53, the ECU 10 calculates the third level of acceleration A3 based on the difference of the real speed of the own vehicle M11 from the target speed for the own vehicle M11. The third level of acceleration A3 is designed to be used for a case where, under the condition that the own vehicle M11 is controlled to track the directly forward vehicle M12 and the real speed of the own vehicle M11 is lower than the target speed for the own vehicle M11, acceleration of the own vehicle M11 is carried out based on the difference between the real speed of the own vehicle M11 and the target speed for the own vehicle M11 due to a lane change of the own vehicle M11 or the directly forward vehicle M12.

Specifically, the ECU 10 calculates the third level of acceleration A3 such that the third level of acceleration A3 becomes larger as the difference of the real speed of the own vehicle M11 from the target speed for the own vehicle M11 becomes larger.

Next, in step S54, the ECU 10 sets a maximum level of acceleration A3max for the third level of acceleration A3 based on the traffic information acquired as the factor information. For example, if the road-shape information, i.e., curve information, including that a forward section of the own road is curved is acquired, the ECU 10 calculates the maximum level of acceleration A3max for the third level of acceleration A3 based on the curve information. The maximum level of acceleration A3max represents an upper limit for the third level of acceleration A3.

Following the operation in step S54, the ECU 10 determines whether the third level of acceleration A3 is larger than the maximum level of acceleration A3max in step S55.

In response to determination that the third level of acceleration A3 is larger than the maximum level of acceleration A3max (YES in step S55), the ECU 10 switches the third level of acceleration A3 to the maximum level of acceleration A3max in step S56. This enables the third level of acceleration A3 to be limited by the maximum level of acceleration A3max. Otherwise, in response to determination that the third level of acceleration A3 is not larger than the maximum level of acceleration A3max (NO in step S55), the acceleration/deceleration control routine proceeds to step S57 while skipping the operation in step S56.

Following the operation in step S56, the ECU 10 determines the acceleration command based on at least one of the first, second, and third levels of acceleration in step S57, so that acceleration of the own vehicle is performed based on the determined acceleration command.

Specifically, if all the first to third levels of acceleration A1 to A3 have been calculated, the ECU 10 can determine the smallest one of the first to third levels of acceleration A1 to A3 as the acceleration command. Otherwise, if two of the first to third levels of acceleration A1 to A3 have been calculated, the ECU 10 can determine the smaller one of the two levels of acceleration as the acceleration command. Otherwise, if only one of the first to third levels of acceleration A1 to A3 has been calculated, the ECU 10 can determine the calculated level of acceleration as the deceleration command.

The vehicle control apparatus 10, i.e., the ECU 10, of the second embodiment achieves the following excellent benefits.

Specifically, the vehicle control apparatus 10, i.e., the ECU 10, of the second embodiment is configured to determine, based on factor information indicative of one or more factors that cause acceleration or deceleration of the traveling own vehicle, a maximum level of deceleration, and perform acceleration control of the own vehicle using the maximum level of acceleration as an upper limit for the acceleration control.

This configuration of the vehicle control apparatus 10 makes it possible to control the level of acceleration in accordance with each factor causing acceleration of the own vehicle to accordingly reduce the occurrence of unexpected situations, such as a situation that causes a driver of the own vehicle to feel a sense of danger. This enables suitably controlled acceleration of the own vehicle.

The vehicle control apparatus 10 is configured to acquire, as the factor information, information indicative of whether a forward adjacent vehicle is in an adjacent lane as a lane-change destination of the own vehicle, and determines the maximum level of acceleration A2max with respect to the forward adjacent vehicle upon determination that the forward adjacent vehicle is in the adjacent lane as the lane-change destination of the own vehicle.

This configuration of the vehicle control apparatus 10 enables, when acceleration of the own vehicle is carried out due to acceleration of the forward adjacent vehicle, limitation on the acceleration of the own vehicle, making it possible to reduce the occurrence of unexpected situations due to excessive acceleration of the own vehicle.

The vehicle control apparatus 10 is configured to set, on condition that the occurrence of a lane-change command for lane-change of the own vehicle, the maximum level of acceleration A2max1 of the own vehicle with respect to the forward adjacent vehicle. This configuration of the vehicle control apparatus 10 enables, when acceleration of the own vehicle is carried out depending on the speed of the forward adjacent vehicle, limitation on the acceleration of the own vehicle, making it possible to reduce the occurrence of unexpected situations due to excessive acceleration of the own vehicle.

The vehicle control apparatus 10 is configured to calculate the first level of acceleration A1 with respect to a directly forward vehicle, the second level of acceleration A2 with respect to a forward adjacent vehicle, and the third level of acceleration A3 based on traffic information, and perform acceleration control of the own vehicle based on the smallest one of the first to third levels of acceleration A1 to A3. This configuration of the vehicle control apparatus 10 makes it possible to perform suitable acceleration control of the own vehicle while reducing the occurrence of unexpected situations due to excessive acceleration of the own vehicle.

The vehicle control apparatus 10 is configured to, under a situation where the tracking control is carried out for a preceding vehicle, calculate the maximum level of acceleration A3max of the own vehicle in accordance with the difference of the real speed of the own vehicle from the target speed for the own vehicle. This configuration of the vehicle control apparatus 10 enables suitable limitation on the third level of acceleration A3 even if the preceding vehicle as the tracking-control target has been lost, making it possible to reduce the occurrence of unexpected situations due to excessive acceleration of the own vehicle.

Modifications

Each of the first and second embodiments describes can be modified as follows:

Each of the first and second embodiments is configured to perform limitation on deceleration or acceleration of the own vehicle when the own vehicle, which is controlled to track a preceding vehicle, makes a lane change. The present disclosure is not limited to the above configuration. Each of the first and second embodiments can be configured to perform, for example, limitation on deceleration or acceleration of the own vehicle when the own vehicle, which is traveling at a constant speed with no preceding vehicle, makes a lane change.

Each of the maximum level of deceleration D2max1 for the second level of deceleration D2 and the maximum level of deceleration D3max1 for the third level of deceleration D3 can be set to a variable.

For example, the maximum level of deceleration D2max1 for the second level of deceleration D2 can be set to become smaller as the location of the rearward adjacent vehicle M5 becomes closer to the own vehicle M1. This enables the degree of limitation on deceleration of the own vehicle M1 to become larger as the location of the rearward adjacent vehicle M5 becomes closer to the own vehicle M1, making it possible to impose suitable limitation on deceleration of the own vehicle M1 in accordance with the location of the rearward adjacent vehicle M5. As another example, the maximum level of deceleration D2max1 for the second level of deceleration D2 can be set to become smaller as the speed of the own vehicle M1 becomes higher. This enables the degree of limitation on deceleration of the own vehicle M1 to become larger as the speed of the own vehicle M1 becomes higher, making it possible to impose suitable limitation on deceleration of the own vehicle M1 in accordance with the speed of the own vehicle M1.

The maximum level of deceleration D3max1 for the third level of deceleration D3 can be set to become smaller as the location of the direct rearward vehicle M3 becomes closer to the own vehicle M1. This enables the degree of limitation on deceleration of the own vehicle M1 to become larger as the location of the direct rearward vehicle M3 becomes closer to the own vehicle M1, making it possible to impose suitable limitation on deceleration of the own vehicle M1 in accordance with the location of the direct rearward vehicle M3.

Each of the first and second embodiments is configured to acquire, as the factor information indicative of one or more factors that cause deceleration of the own vehicle, the traffic information that includes at least one of the road-shape information, the intersection information, and the traffic sign information, and calculate the third level of deceleration D3 based on the traffic information. The present disclosure can be configured to eliminate calculation of the third level of deceleration D3. In this modification, the operations in steps S31 to S38 can be eliminated from the acceleration/deceleration control routine illustrated in FIG. 3. Specifically, the ECU 10 can determine, in step S39, the larger one of the first and second levels of deceleration D1 and D2 as the deceleration command, so that deceleration of the own vehicle is performed based on the determined deceleration command.

Each of the first and second embodiments is configured to execute, as the acceleration/deceleration control, the tracking control, i.e., the adaptive cruise control, that sets the target speed for the own vehicle and causes the own vehicle to track a target preceding vehicle traveling in front of the own vehicle using the target speed as an upper limit for the speed of the own vehicle. The present disclosure is not limited to the tracking control.

Specifically, the present disclosure can be configured to perform, as the acceleration/deceleration control, constant-speed cruise control (CC control) that sets the target speed for the own vehicle and causes the own vehicle to travel at the target speed.

In this modification, the ECU 10 can be configured to acquire, as the factor information, the traffic information that includes at least one of the road-shape information in a forward direction of the own vehicle in the traveling direction thereof, the intersection information in the forward direction of the own vehicle in the traveling direction thereof, and the traffic sign information in the forward direction of the own road in the traveling direction thereof, and set a maximum level of acceleration of the own vehicle based on the difference of the real speed of the own vehicle from the target speed for the own vehicle and the traffic information. In particular, the ECU 10 of this modification can be configured to set the level of acceleration of the own vehicle based on the difference of the real speed of the own vehicle from the target speed for the own vehicle, set the maximum level of acceleration of the own vehicle based on the traffic information, and limit the level of acceleration based on the maximum level of acceleration.

The control apparatuses and their control methods executable by the control apparatuses in the present disclosure can be implemented by a dedicated computer including a memory and a processor programmed to perform one or more functions embodied by one or more computer programs.

The control apparatuses and their control methods executable by the control apparatuses in the present disclosure can also be implemented by a dedicated computer including a processor comprised of one or more dedicated hardware logic circuits.

The control apparatuses and their control methods executable by the control apparatuses in the present disclosure can further be implemented by a processor system comprised of a memory, a processor programmed to perform one or more functions embodied by one or more computer programs, and one or more hardware logic circuits.

The one or more programs can be stored in a computer-readable non-transitory storage medium as instructions to be carried out by a computer or a processor.

The following describes characteristic configurations.

First Configuration

A vehicle control apparatus for executing acceleration/deceleration control of an own vehicle traveling in a lane as an own lane. The vehicle control apparatus includes an acquiring unit configured to acquire factor information indicative of one or more factors that cause acceleration or deceleration of the own vehicle while the own vehicle is subjected to the acceleration/deceleration control. The vehicle control apparatus includes a setting unit configured to set, based on the factor information, at least one of a maximum level of deceleration and a maximum level of acceleration. The maximum level of deceleration represents a maximum rate of reduction in a speed of the own vehicle during deceleration of the own vehicle. The maximum level of acceleration represents a maximum rate of increase in the speed of the own vehicle during acceleration of the own vehicle. The vehicle control apparatus includes an acceleration/deceleration control unit configured to have at least one of (I) A first function of performing deceleration control of the own vehicle using the maximum level of deceleration as an upper limit for the deceleration control (II) A second function of performing acceleration control of the own vehicle using the maximum level of acceleration as an upper limit for the acceleration control

Second Configuration

In the vehicle control apparatus according to the first configuration, the acquiring unit is configured to acquire, as the factor information, information indicative of whether a forward adjacent vehicle is traveling in a forward adjacent area of the own vehicle on an adjacent lane that is adjacent to the own lane. The setting unit is configured to set, upon determination that the forward adjacent vehicle is traveling in the forward adjacent area of the own vehicle in the adjacent lane under execution of the acceleration/deceleration control, at least one of (I) The maximum level of deceleration with respect to the forward adjacent vehicle (II) The maximum level of acceleration with respect to the forward adjacent vehicle

Third Configuration

In the vehicle control apparatus according to the first configuration, the acceleration/deceleration control unit is configured to execute, as the acceleration/deceleration control, tracking control that causes the own vehicle to track, as a target preceding vehicle, a vehicle traveling ahead of the own vehicle in the own lane. The acceleration/deceleration control unit is configured to determine, when the own vehicle makes a lane change from the own lane to a lane adjacent to the own lane, whether a forward adjacent vehicle is traveling in a forward adjacent area of the own vehicle in the adjacent lane. The acceleration/deceleration control unit is configured to switch, upon determination that the forward adjacent vehicle is traveling in the forward adjacent area of the own vehicle in the adjacent lane, the target preceding vehicle of the tracking control from the vehicle traveling ahead of the own vehicle in the own lane to the forward adjacent vehicle.

The acquiring unit is configured to acquire, as the factor information, information indicative of whether the forward adjacent vehicle is traveling in the forward adjacent area of the own vehicle in the adjacent lane. The setting unit is configured to set, upon determination that the forward adjacent vehicle is traveling in the forward adjacent area of the own vehicle in the adjacent lane under execution of the tracking control, at least one of (I) The maximum level of deceleration with respect to the forward adjacent vehicle as the target preceding vehicle of the tracking control (II) The maximum level of acceleration with respect to the forward adjacent vehicle as the target preceding vehicle of the tracking control

Fourth Configuration

In the vehicle control apparatus according to the second configuration, the setting unit is configured to set, on condition that an occurrence of a lane-change command for lane-change of the own vehicle from the own lane to the adjacent lane, at least one of the maximum level of deceleration with respect to the forward adjacent vehicle and the maximum level of acceleration with respect to the forward adjacent vehicle.

Fifth Configuration

In the vehicle control apparatus according to the second configuration, the setting unit is configured to set the maximum level of deceleration when the own vehicle makes a lane change to be smaller than the maximum level of deceleration when the own vehicle does not make a lane change.

Sixth Configuration

The vehicle control apparatus according to the second configuration further includes a rearward-adjacent vehicle determiner configured to determine whether a rearward adjacent vehicle is traveling in a rearward adjacent area of the own vehicle in the adjacent lane. The setting unit is configured to set the maximum level of deceleration upon determination that the rearward adjacent vehicle is traveling in the rearward adjacent area of the own vehicle in the adjacent lane to be smaller than the maximum level of deceleration upon determination that the rearward adjacent vehicle is not traveling in the rearward adjacent area of the own vehicle in the adjacent lane.

Seventh Configuration

In the vehicle control apparatus according to the second configuration, the acceleration/deceleration control unit is configured to calculate, when performing deceleration of the own vehicle with respect to a directly forward vehicle traveling ahead of the own vehicle in the own lane, a first level of deceleration with respect to the directly forward vehicle. The acceleration/deceleration control unit is configured to calculate, when performing deceleration of the own vehicle with respect to the forward adjacent vehicle, a second level of deceleration with respect to the forward adjacent vehicle. The acceleration/deceleration control unit is configured to execute the acceleration/deceleration control based on a larger one of the first level of deceleration and the second level of deceleration.

Eighth Configuration

In the vehicle control apparatus according to the second configuration, the acceleration/deceleration control unit is configured to (I) Calculate, when performing acceleration of the own vehicle with respect to a directly forward vehicle traveling ahead of the own vehicle in the own lane, a first level of acceleration with respect to the directly forward vehicle (II) Calculate, when performing acceleration of the own vehicle with respect to the forward adjacent vehicle, a second level of acceleration with respect to the forward adjacent vehicle (III) Execute the acceleration/deceleration control based on a smaller one of the first level of acceleration and the second level of acceleration

Ninth Configuration

In the vehicle control apparatus according to the second configuration, the acceleration/deceleration control unit is configured to set a target speed for the own vehicle, and execute the acceleration/deceleration control based on the target speed. The acquiring unit is configured to acquire, as the factor information, at least one of first information on a road shape in a forward direction of the own vehicle, second information on one or more intersections in the forward direction of the own vehicle, and third information on one or more traffic signs in the forward direction of the own vehicle. The setting unit is configured to set, under execution of the acceleration/deceleration control, the maximum level of acceleration of the own vehicle based on a difference of a real speed of the own vehicle from the target speed and the traffic information.

Tenth Configuration

In the vehicle control apparatus according to the first configuration, the acquiring unit is configured to acquire, as the factor information, at least one of first information on a road shape in a forward direction of the own vehicle, second information on one or more intersections in the forward direction of the own vehicle, and third information on one or more traffic signs in the forward direction of the own vehicle. The setting unit is configured to set at least one of the maximum level of deceleration and the maximum level of acceleration based on the traffic information.

Eleventh Configuration

The vehicle control apparatus according to the first configuration further includes a rearward vehicle determiner configured to determine whether a rearward vehicle is traveling behind the own vehicle in the own lane. The setting unit is configured to set the maximum level of deceleration upon determination that the rearward vehicle is traveling behind the own vehicle in the own lane to be smaller than the maximum level of deceleration upon determination that the rearward vehicle is not traveling behind the own vehicle in the own lane.

Twelfth Configuration

A processor-readable vehicle control program product for causing a processor to execute acceleration/deceleration control of an own vehicle traveling in a lane as an own lane. The processor-readable vehicle control program product includes a storage media, and a set of computer-program instructions stored in the storage media.

The computer-program instructions causing a processor to execute the following steps of (I) Acquiring factor information indicative of one or more factors that cause acceleration or deceleration of the own vehicle while the own vehicle is subjected to the acceleration/deceleration control (II) Setting, based on the factor information, at least one of a maximum level of deceleration and a maximum level of acceleration, the maximum level of deceleration representing a maximum rate of reduction in a speed of the own vehicle during deceleration of the own vehicle, the maximum level of acceleration representing a maximum rate of increase in the speed of the own vehicle during acceleration of the own vehicle (III) Performing at least one of deceleration control of the own vehicle using the maximum level of deceleration as an upper limit for the deceleration control, and acceleration control of the own vehicle using the maximum level of acceleration as an upper limit for the acceleration control While the illustrative embodiments of the present disclosure have been described herein, the present disclosure is not limited to the embodiments and their configurations described herein, but includes any and all modifications and/or alternations as long as they are within a range of equivalency of the present disclosure. Additionally, (i) various combinations and embodiments and (ii) modified combinations and embodiments, which can be formed by adding one or more elements to the various combinations and embodiments are within the scope and technical idea of the present disclosure.

What is claimed is:

1. A vehicle control apparatus for executing acceleration/deceleration control of an own vehicle traveling in a lane as an own lane, the vehicle control apparatus comprising:

an acquiring unit configured to acquire factor information indicative of one or more factors that cause acceleration or deceleration of the own vehicle while the own vehicle is subjected to the acceleration/deceleration control;

a setting unit configured to set, based on the factor information, at least one of a maximum level of deceleration and a maximum level of acceleration, the maximum level of deceleration representing a maximum rate of reduction in a speed of the own vehicle during deceleration of the own vehicle, the maximum level of acceleration representing a maximum rate of increase in the speed of the own vehicle during acceleration of the own vehicle; and an acceleration/deceleration control unit configured to comprise at least one of:

a first function of performing deceleration control of the own vehicle using the maximum level of deceleration as an upper limit for the deceleration control; and a second function of performing acceleration control of the own vehicle using the maximum level of acceleration as an upper limit for the acceleration control, wherein the acceleration/deceleration control unit is configured to:

execute, as the acceleration/deceleration control, tracking control that causes the own vehicle to track, as a target preceding vehicle, a vehicle traveling ahead of the own vehicle in the own lane;

determine, when the own vehicle makes a lane change from the own lane to a lane adjacent to the own lane, whether a forward adjacent vehicle is traveling in a forward adjacent area of the own vehicle in the adjacent lane; and switch, upon determination that the forward adjacent vehicle is traveling in the forward adjacent area of the own vehicle in the adjacent lane, the target preceding vehicle of the tracking control from the vehicle traveling ahead of the own vehicle in the own lane to the forward adjacent vehicle;

wherein the factor information includes information indicative of whether the forward adjacent vehicle is traveling in the forward adjacent area of the own vehicle in the adjacent lane, wherein the setting unit is configured to set, upon determination that the forward adjacent vehicle is traveling in the forward adjacent area of the own vehicle in the adjacent lane under execution of the tracking control, at least one of:

the maximum level of deceleration with respect to the forward adjacent vehicle as the target preceding vehicle of the tracking control; and the maximum level of acceleration with respect to the forward adjacent vehicle as the target preceding vehicle of the tracking control.

2. The vehicle control apparatus according to claim 1, wherein:

the acquiring unit is configured to acquire, as the factor information, information indicative of whether a forward adjacent vehicle is traveling in a forward adjacent area of the own vehicle on an adjacent lane that is adjacent to the own lane; and the setting unit is configured to set, upon determination that the forward adjacent vehicle is traveling in the forward adjacent area of the own vehicle in the adjacent lane under execution of the acceleration/deceleration control, at least one of:

the maximum level of deceleration with respect to the forward adjacent vehicle; and the maximum level of acceleration with respect to the forward adjacent vehicle.

3. The vehicle control apparatus according to claim 2, wherein:

the setting unit is configured to set, on condition that an occurrence of a lane-change command for lane-change of the own vehicle from the own lane to the adjacent lane, at least one of the maximum level of deceleration with respect to the forward adjacent vehicle and the maximum level of acceleration with respect to the forward adjacent vehicle.

4. The vehicle control apparatus according to claim 2, wherein:

the setting unit is configured to set the maximum level of deceleration when the own vehicle makes a lane change to be smaller than the maximum level of deceleration when the own vehicle does not make a lane change.

5. The vehicle control apparatus according to claim 2, further comprising:

a rearward-adjacent vehicle determiner configured to determine whether a rearward adjacent vehicle is traveling in a rearward adjacent area of the own vehicle in the adjacent lane, wherein:

the setting unit is configured to set the maximum level of deceleration upon determination that the rearward adjacent vehicle is traveling in the rearward adjacent area of the own vehicle in the adjacent lane to be smaller than the maximum level of deceleration upon determination that the rearward adjacent vehicle is not traveling in the rearward adjacent area of the own vehicle in the adjacent lane.

6. The vehicle control apparatus according to claim 2, wherein:

the acceleration/deceleration control unit is configured to:

calculate, when performing deceleration of the own vehicle with respect to a directly forward vehicle traveling ahead of the own vehicle in the own lane, a first level of deceleration with respect to the directly forward vehicle;

calculate, when performing deceleration of the own vehicle with respect to the forward adjacent vehicle, a second level of deceleration with respect to the forward adjacent vehicle; and execute the acceleration/deceleration control based on a larger one of the first level of deceleration and the second level of deceleration.

7. The vehicle control apparatus according to claim 2, wherein:

the acceleration/deceleration control unit is configured to:

calculate, when performing acceleration of the own vehicle with respect to a directly forward vehicle traveling ahead of the own vehicle in the own lane, a first level of acceleration with respect to the directly forward vehicle;

calculate, when performing acceleration of the own vehicle with respect to the forward adjacent vehicle, a second level of acceleration with respect to the forward adjacent vehicle; and execute the acceleration/deceleration control based on a smaller one of the first level of acceleration and the second level of acceleration.

8. The vehicle control apparatus according to claim 2, wherein:

the acceleration/deceleration control unit is configured to:

set a target speed for the own vehicle; and execute the acceleration/deceleration control based on the target speed;

the acquiring unit is configured to acquire, as the factor information, at least one of first information on a road shape in a forward direction of the own vehicle, second information on one or more intersections in the forward direction of the own vehicle, and third information on one or more traffic signs in the forward direction of the own vehicle; and the setting unit is configured to set, under execution of the acceleration/deceleration control, the maximum level of acceleration of the own vehicle based on a difference of a real speed of the own vehicle from the target speed and a traffic information.

9. The vehicle control apparatus according to claim 1, wherein:

the acquiring unit is configured to acquire, as the factor information, at least one of first information on a road shape in a forward direction of the own vehicle, second information on one or more intersections in the forward direction of the own vehicle, and third information on one or more traffic signs in the forward direction of the own vehicle; and the setting unit is configured to set at least one of the maximum level of deceleration and the maximum level of acceleration based on a traffic information.

10. The vehicle control apparatus according to claim 1, further comprising:

a rearward vehicle determiner configured to determine whether a rearward vehicle is traveling behind the own vehicle in the own lane, wherein:

the setting unit is configured to set the maximum level of deceleration upon determination that the rearward vehicle is traveling behind the own vehicle in the own lane to be smaller than the maximum level of deceleration upon determination that the rearward vehicle is not traveling behind the own vehicle in the own lane.

11. A processor-readable vehicle control program product for causing a processor to execute acceleration/deceleration control of an own vehicle traveling in a lane as an own lane, the processor-readable vehicle control program product comprising:

a non-transitory storage medium; and a set of computer-program instructions stored in the non-transitory storage medium, the computer-program instructions causing a processor to execute the following steps of:

acquiring factor information indicative of one or more factors that cause acceleration or deceleration of the own vehicle while the own vehicle is subjected to the acceleration/deceleration control;

setting, based on the factor information, at least one of a maximum level of deceleration and a maximum level of acceleration, the maximum level of deceleration representing a maximum rate of reduction in a speed of the own vehicle during deceleration of the own vehicle, the maximum level of acceleration representing a maximum rate of increase in the speed of the own vehicle during acceleration of the own vehicle;

performing at least one of:

deceleration control of the own vehicle using the maximum level of deceleration as an upper limit for the deceleration control; and

30 acceleration control of the own vehicle using the maximum level of acceleration as an upper limit for the acceleration control;

executing tracking control that causes the own vehicle to track, as a target preceding vehicle, a vehicle traveling ahead of the own vehicle in the own lane;

determining, when the own vehicle makes a lane change from the own lane to a lane adjacent to the own lane, whether a forward adjacent vehicle is traveling in a forward adjacent area of the own vehicle in the adjacent lane; and switching, upon determination that the forward adjacent vehicle is traveling in the forward adjacent area of the own vehicle in the adjacent lane, the target preceding vehicle of the tracking control from the vehicle traveling ahead of the own vehicle in the own lane to the forward adjacent vehicle.

*     *     *     *     *